INVENTOR.
David Eklov
BY Strauch, Nolan & Neale
ATTORNEYS

March 27, 1962 D. EKLÖV 3,027,429

LOUDSPEAKING TELEPHONE INSTRUMENT

Filed Dec. 26, 1957 3 Sheets-Sheet 2

INVENTOR.
David Eklov

BY

Strauch, Nolan + Neale

ATTORNEYS

March 27, 1962 D. EKLÖV 3,027,429

LOUDSPEAKING TELEPHONE INSTRUMENT

Filed Dec. 26, 1957 3 Sheets-Sheet 3

INVENTOR.
DAVID EKLOV

BY

Strauch, Nolan & Neale

ATTORNEYS

United States Patent Office 3,027,429

Patented Mar. 27, 1962

3,027,429

LOUDSPEAKING TELEPHONE INSTRUMENT

David Eklöv, Alvsjo, Sweden, assignor to Svenska Relafabriken Abn Ab, Tyreso, Sweden, a corporation of Sweden Filed Dec. 26, 1957, Ser. No. 705,382
Claims priority, application Sweden Nov. 26, 1957
3 Claims. (Cl. 179—81)

The present invention relates to a loudspeaking telephone instrument including a microphone and a loudspeaker and amplifiers associated with the microphone and the loudspeaker for amplifying the speech signals transmitted from the microphone to the line and from the line to the loudspeaker respectively.

Previously known loudspeaking telephone instruments have suffered from certain drawbacks. Thus the known instruments have not been provided with adequate means for suppressing the howling and singing caused by acoustic feed-back between the loudspeaker and the microphone. In the case that means for eleminating howling and singing have been provided, these means have usually been designed to cut off the temporarily passive amplifier in response to speech currents in the active amplifier which may result in clipping syllables when the direction of the conversation is changed. Moreover, the amplifiers in the known instruments of this type have usually been designed to receive the required direct current operating power from the power mains which entails difficulties in the installation and also involves the risk of high voltage from the power mains being accidentally transferred to the telephone network. The connection to the power mains may also result in disturbing voltages being applied to the telephone network, and in case of failure in the power mains the telephone instrument becomes inoperative.

It is an object of the present invention to provide a loudspeaking telephone instrument which does not suffer from the drawbacks mentioned above. According to the invention the loudspeaking telephone instrument is adapted to receive the direct current power required for the operation of the amplifiers over the same line which is used for the transmission of speech currents to and from the instrument. The instrument comprises a voltage stabilizing device for stabilizing the direct voltage supplied over the line, so that the instrument can be connected to telephone networks of highly varying direct voltage. Furthermore, the telephone instrument is provided with gain control circuits operative in response to speech currents in the active amplifier to produce an increase of the gain in the active amplifier and a reduction of the gain in the passive amplifier, the control circuits being so designed that the reduction of the gain in the passive amplifier always becomes larger than the increase of the gain in the active amplifier. This principle of gain control permits a comparatively high initial gain in both amplifiers, and the microphone and the loudspeaker can be assembled in a single unit without any risk of howling and singing. The control action never causes a complete cut-off of any of the amplifiers, and the interconnected subscribers can always hear each other.

According to the invention the telephone instrument is also provided with means for protecting the amplifiers against excess voltage which may appear on the line. Moreover the telephone instrument comprises a polarity control device which ensures that the polarity of the voltage applied to the amplifiers is always of the correct polarity irrespective of the polarity of the conductors of the line.

Other features of the invention will appear from the following description in conjunction with the accompanying drawings.

Figure 3A:
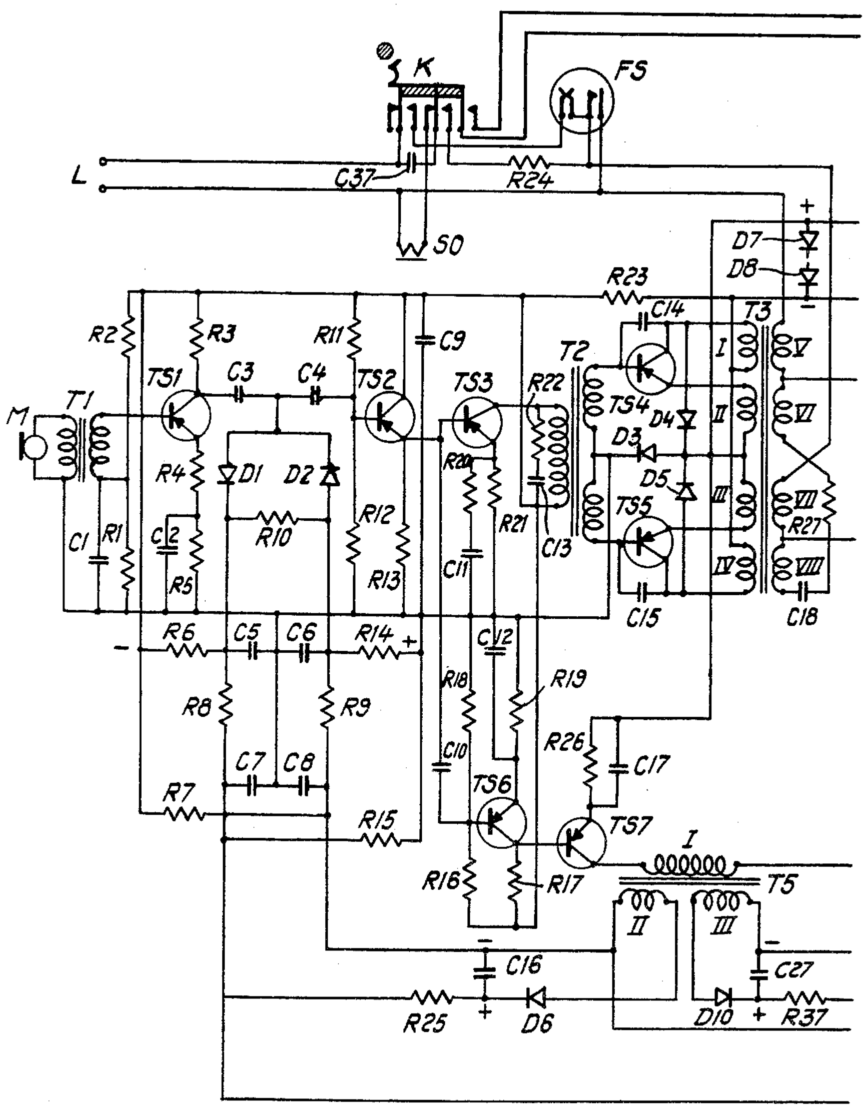
Figure 3B:
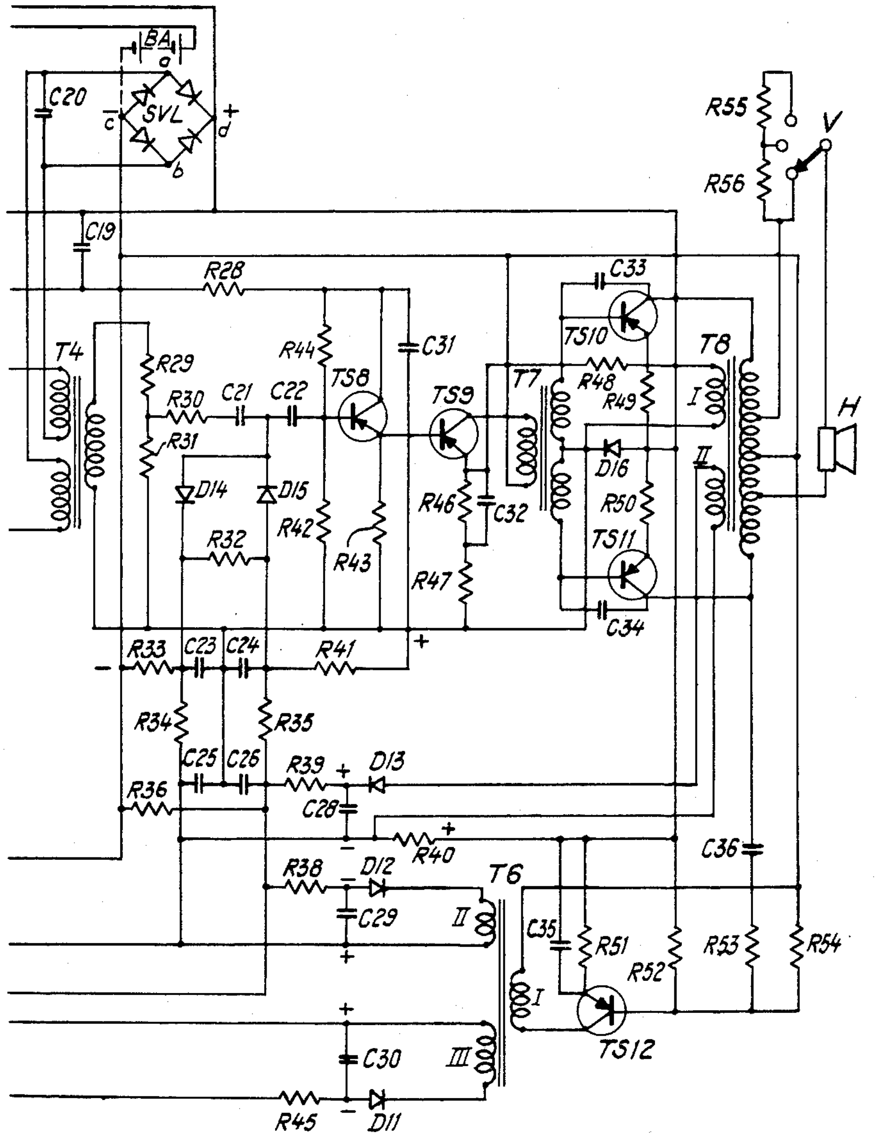

FIGS. 3*a* and 3*b* show together a detailed circuit diagram of a loudspeaking telephone instrument embodying the invention.

Figure 1:
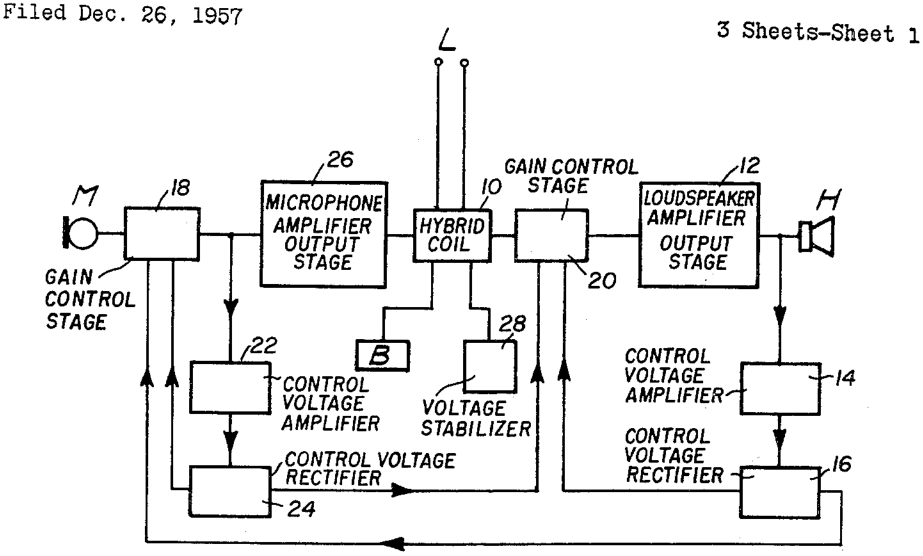
FIG. 1 shows a block diagram of a loudspeaking telephone instrument embodying the invention.

Referring now to FIGURE 1, the connecting terminals L are on the loud-speaking telephone instrument for connection to a 2-wire telephone line. The loud-speaking telephone instrument contains a microphone M having separate amplifier units composed of a gain control stage 18, an output stage 26, a control voltage amplifier 22 and a control voltage rectifier 24, and a loudspeaker H having a similar circuit including a gain control stage 20, an output stage 12, a control voltage amplifier 14 and control voltage rectifier. The output of the microphone amplifier and the input of the loud-speaker amplifier are connected to terminals L of the telephone by hybrid coil 10. A voltage stabilizer and a balance B are diagrammatically illustrated in FIGURE 1 as also being connected to hybrid coil 10.

Speech or signalling currents incoming from the line to the telephone instrument are applied to the loudspeaker amplifier over the hybrid coil 10. Part of the amplified voice frequency voltage is derived from the output stage 12 of the loudspeaker amplifier and applied to the amplifier 14. From this amplifier the voltage is applied to rectifier 16 which delivers a first direct voltage to control stage 18 in the microphone amplifier for reducing the gain of this amplifier. A second direct voltage is derived from rectifier 16 and applied to the control stage 20 in the loudspeaker amplifier to increase the gain of this amplifier. When the incoming speech signal ceases, the control action also ceases and the gain of the amplifier is restored to its initial value.

When speech is transmitted from the microphone to the line, a portion of the speech signal voltage is fed from the microphone amplifier over the amplifier 22 to the rectifier 24. From this rectifier a first direct voltage is applied to the control stage 20 for reducing the gain of the loudspeaker amplifier, and a second direct voltage is applied to the control stage 22 for increasing the gain of the microphone amplifier.

It will be seen that the control circuit extending from each amplifier is divided in two branches, the first of which is connected to the amplifier from which the control circuit extends, and the other of which is connected to the other amplifier. The two branches are so designed that when speech signals are transmitted in the amplifier from which the control circuit extends, the gain of this amplifier is increased, while the gain in the other amplifier is reduced. The two branches are so constituted that the control voltages applied to the amplifiers are of a polarity and magnitude effective to increase the gain of the active amplifier by an amount that is always less than the reduction of gain of the passive amplifier. This is illustrated by the curves in FIG. 2.

Figure 2:
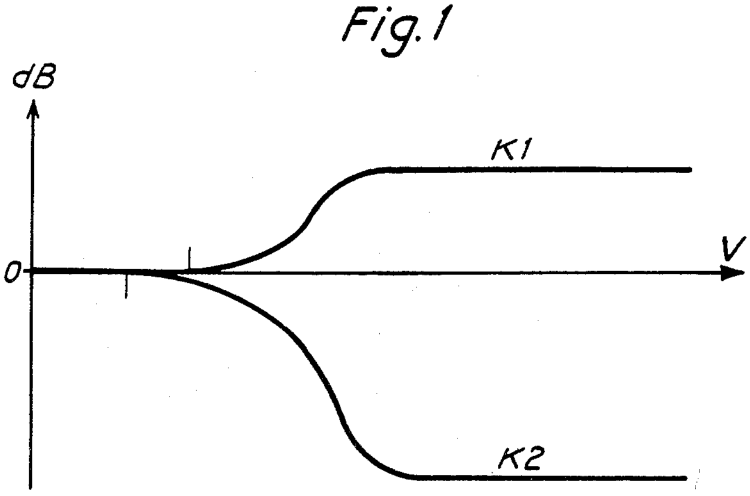
FIG. 2 shows gain control characteristics.

In FIG. 2 curve K1 represents the gain in the active amplifier, while curve K2 represents the gain in the passive amplifier as a function of the speech signal voltage applied to the active amplifier. In the diagram the gain is given in decibel with the initial gain as reference level. The initial gain is assumed to be the same for both amplifiers. The amplifiers and control circuits per se are claimed specifically in my copending application Serial No. 785,528, filed January 7, 1959, and application Serial No. 705,283, filed on even date herewith.

As will be seen from FIG. 2 the control action does not start until the amplitude of the applied signal voltage has reached a certain threshold value. As will also be seen from the figure this threshold value is different for the two amplifiers so that the control action in the active amplifier does not commence until the signal voltage has reached a value which is higher than that for which the control action is commenced in the passive amplifier. It appears further from FIG. 2 that the reduction of the gain of the passive amplifier is always larger than the increase of the gain of the active amplifier.

The control circuits include limiting devices which cause the gain in the two amplifiers to become substantially constant when the applied signal voltage exceeds a certain value, that is curves K1 and K2 are running horizontally for signal voltages exceeding said value.

Both in the microphone amplifier and in the loudspeaker amplifier the control alternating voltage is taken out from points located after the respective control stage. Hereby the control action takes place very rapidly and becomes imperceptible to the interconnected subscribers.

How the control circuits are designed to bring about the control action illustrated in FIG. 2 will be described in detail with reference to FIGS. 3*a* and 3*b*.

FIGS. 3*a* and 3*b* placed side by side show together a complete circuit diagram of a loudspeaking telephone instrument according to the invention. In these figures M designates a microphone, K is a switch intended to be operated upon a call to or from the instrument, FS is a dial, SO is a signalling device, SVL is a rectifier bridge, V a volume control device and H a loudspeaker. The amplifying elements in the two amplifiers consist of transistors which are designated TS accompanied by a numeral. Capacitors and resistors included in the instrument are designated C and R respectively accompanied by numerals. The instrument further includes a number of rectifier diodes or similar non-linear elements which are designated D accompanied by a numeral. The transformers included in the instrument are designated T accompanied by a numeral.

The units shown schematically in the block diagram in FIG. 1 are shown in detail in FIGS. 3*a* and 3*b* as appears from the following.

The microphone transformer T1 is connected to a resistance-coupled amplifier stage including transistor TS1. The control stage 18 is formed by diodes D1 and D2 and a cathode follower amplifying stage with transistor TS2. The amplifier 22 consists of the amplifying stages TS6 and TS7 and an output transformer T5. The rectifier 24 includes a diode D6 and capacitor C16 and diode D10 and capacitor C27. The output stage 26 includes the transistors TS3, TS4 and TS5, the latter two transistors forming a push-pull amplifying stage, and the driver transformer T2.

Transformer T4 is the input transformer of the loudspeaker amplifier. The control stage 20 is formed by diodes D14 and D15 and a cathode follower amplifier stage with transistor TS8. The output stage 12 includes transistors TS9, TS10 and TS11, the two latter transistors forming a push-pull amplifier stage, and the driver transformer T7, output transformer T8 and the volume control V. The amplifier 14 includes transistor TS12 and the output transformer T6. The rectifier 16 comprises diode D11, capacitor C30, diode D12 and a capacitor C29.

The voltage stabilizing and polarity control device 28 comprises the rectifier bridge SVL, the voltage stabilizing elements D7—D8 and capacitors C19 and C20.

The balance B consists of resistor R27 and capacitor C18.

The hybrid coil 10 is represented in FIG. 3*a* by the transformer T3.

The signalling device SO consists of a bell, buzzer or the like.

The amplifiers obtain the required operating direct voltage from the telephone line L connected to the instrument. This feature is claimed in my copending application Serial No. 705,359, filed on even date herewith. When switch K is operated, the line voltage is applied to input terminals *a* and *b* of rectifier bridge SVL. From the output terminals *c* and *d* of rectifier bridge SVL the direct voltage is applied to the amplifier.

Due to the rectifier bridge SVL the polarity of the direct voltage applied to the amplifiers will be the same irrespective of the polarity of the voltage on the wires of the line.

The operating voltage of the amplifiers is stabilized to a suitable value by a voltage stabilizing device connected across the output terminals *c* and *d*. The stabilizing device consists of a plurality of non-linear elements D7—D8. The value of the direct voltage applied to the subscribers' lines is different for different telephone networks, and the said voltage stabilizing device makes it possible to connect the telephone instrument to any existing telephone network.

A capacitor C19 is connected between the output terminals *c* and *d* of rectifier bridge SVL. This capacitor which is preferably an electrolytic capacitor with a very high capacity, e.g. 500 microfarads, serves as a storage capacitor and is charged during periods of low excitation of the amplifiers and delivers additional power during periods of full excitation of the amplifiers.

If the resistance of the line connected to the telephone instrument is very high, the voltage applied to the amplifiers from the line may be insufficient to permit satisfactory operation of the amplifiers. In such case a local buffer battery may be provided in the instrument. Such a battery is shown in FIG. 3*b* and is designated BA. This battery preferably consists of a miniature storage battery, and the telephone instrument is provided with suitable connecting means for facilitating the insertion of this battery in the instrument if required. However in the case of normal line resistances this battery is superfluous.

A capacitor C20 is connected between the input terminals of rectifier bridge SVL and serves as a by-pass capacitor for the incoming signal voltage.

The semiconductor diodes D3 and D16 connected to the output stages of the amplifiers consist of elements which maintain a practically constant voltage within a certain range of operation independent of the intensity of the current flowing through the elements. The base voltage for transistors TS4, TS5 and TS10, TS11 is thus maintained constant. Moreover, the semiconductor diodes D3 and D16 have a negative temperature coefficient and thus afford an effective voltage and temperature stabilization.

The output stage of the microphone amplifier is provided with a device for protecting transistors TS4 and TS5 against excess voltage which may appear on the line. This part of the circuit is described and claimed in my copending application Serial No. 705,359, filed on even date herewith. This protective device consists of diodes D4 and D5. As appears from the figure these diodes have normally a large negative bias and therefore do not load the push-pull amplifier stage consisting of transistors TS4 and TS5. If an excess voltage arrives from the line to the instrument, voltages are induced in windings II and IV of transformer T3 which will coact with or counteract the negative biasses across diodes D4 and D5 according to the polarity of the excess voltage. When the voltages in the said transformer windings have become so large that one of the diodes commences to conduct current, the corresponding transformer winding is short-circuited by the conductive diode whereby the excess voltage is heavily damped so that it cannot cause damage to the transistors. The voltage across the other transformer winding will be added to the negative bias across the diode connected in parallel with this transformer winding, but the resulting voltage cannot assume a value higher than about twice the value of the negative bias on the diode. This is due to the fact that when one of the transformer windings II and IV is short-circuited, the voltage across the transformer windings connected to the line will be heavily damped.

The control circuits for the automatic control of the gain of the amplifiers in response to the transmitted speech signal voltages will now be described.

In the microphone amplifier a portion of the speech signal voltage is taken from the emitter of transistor TS2 and amplified in transistors TS6 and TS7 and is applied to the primary winding of transformer T5. This transformer has two separate secondary windings II and III, and the output alternating voltages from these windings are rectified in diodes D6 and D10 respectively. Hence direct voltages with the polarities indicated on the drawing will appear across capacitors C16 and C27.

The direct voltage across capacitor C16 is applied to the control stage in the microphone amplifier and causes an increase in the gain of this amplifier in a manner to be described below. The direct voltage across capacitor C27 is applied to the control stage of the loudspeaker amplifier and causes a reduction of the gain of the loudspeaker amplifier. The winding III of transformer T5 has a larger number of turns than winding II of the same transformer, and therefore the direct voltage across capacitor C27 will become larger than the direct voltage across capacitor C16 which results in the reduction of the gain of the loudspeaker amplifier always becoming larger than the increase of the gain of the microphone amplifier.

The diode D6 receives a negative bias through the resistors R7 and R15. Due to this bias the increase in the gain of the microphone amplifier commences later than the reduction of the gain of a loudspeaker amplifier as shown in FIG. 2.

The gain of the microphone amplifier is determined by the current flowing through diodes D1 and D2. These diodes have a non-linear characteristic so that the resistance is decreased with increasing current through them. Diodes D1 and D2 are biased through resistors R14 and R16, and the current produced by this bias through the diodes determines the initial gain of the amplifier. The voltage across capacitor C16 counteracts this bias and thus causes a reduction of the current through the diodes so that their resistance is increased. Since with regard to alternating voltage the diodes are connected in parallel to the input of the control stage, this results in an increase of the gain of the microphone amplifier.

Capacitors C5, C6, C7 and C8 and resistors R8 and R9 form a low pass filter. A resistor R10 is connected in parallel with diodes D1 and D2 and serves as a discharge resistor for the filter capacitors. This resistor and the associated capacitors are so dimensioned that the gain is restored to the initial level with a suitable time delay.

In order that the voltages across resistors R6 and R14 shall not cause the wrong bias on diodes D6 and D11 during intervals of initial gain, the polarity of the voltage is reversed ahead of the low pass filter by means of resistors R7 and R15.

In the loudspeaker amplifier diodes D14 and D15 perform the same function as diodes D1 and D2 in the microphone amplifier. Diodes D14 and D15 receive bias through resistors R41 and R33. The direct voltage across the capacitor C27 is added to this bias whereby the gain in the loudspeaker amplifier is reduced.

In the loudspeaker amplifier a portion of the signal voltage is taken from the output transformer T8 and amplified in transistor TS12 and is then applied to the primary winding of transformer T6. The circuits connected to the two secondary windings of this transformer are designed and arranged in a similar manner as the corresponding circuits connected to the secondary windings of transformer T5 in the microphone amplifier. Thus when speech signals are passing through the loudspeaker amplifier the gain control is effected in the same manner as described above with reference to the microphone amplifier with the difference however that the gain of the loudspeaker amplifier is now increased while the gain of the microphone amplifier is reduced.

In the loudspeaker amplifier the control voltage is taken from the output stage of the amplifier which is advantageous because in such case the control alternating voltage does not require any large amplification before it is rectified. Therefore there is only one transistor TS12 in the control voltage amplifier stage of the loudspeaker amplifier. In the microphone amplifier the control alternating voltage cannot be taken from the output stage because in such case signal voltages incoming from the line could be applied to the control voltage amplifier stage of the microphone amplifier and thereby cause a control action counteracting the desired control action. This is the reason why the control voltage in the microphone amplifier is taken from one of the first amplifier stages.

As appears from FIG. 3*a* the output stage of the microphone amplifier has a negative feed-back, and the microphone amplifier therefore has a low output impedance.

The output transformer T8 of the loudspeaker amplifier has a secondary winding I from which a negative feed-back voltage is taken to the preceding amplifier stage (TS9). From the other secondary winding II of transformer T8 an alternating voltage is taken which is applied to diode D13. When the amplifier is operating with nearly maximum excitation, this voltage is rectified in diode D13 so that a direct voltage with the polarity indicated in the figure is obtained across capacitor C28. This direct voltage strives to increase the current through diodes D14 and D15 and thereby reduce the gain so that overexcitation is prevented.

The amplifier stages for amplifying the alternating control voltage in both amplifiers are so designed that they cause an amplitude limitation so that the increase and reduction respectively of the gain in the amplifiers becomes constant when the amplitude of the signal voltage exceeds a predetermined value.

The resistors R10 and R32 can be of the type that has a negative temperature coefficient so that they contribute to the temperature stabilization of the respective amplifiers.

In the embodiment described above the desired relation between the characteristics for gain increase and gain reduction is obtained by suitable dimensioning of the windings on transformers T5 and T6 and by properly biassing diodes D6 and D12. However the said relation can also be obtained in other ways, e.g. by choosing diodes D6, D10, D11 and D12 with different current-voltage characteristics.

The loudspeaking telephone instrument àccording to the invention can easily be built into a single compact unit having small dimensions.

What is claimed is:

1. A loudspeaking telephone instrument adapted to be connected to a telephone line having two wires, said instrument containing a rectifier bridge; two amplifier units, one for each direction of signal transmission, connected to said telephone line; one amplifier unit comprising a push-pull output stage inductively coupled to said telephone line; the other amplifier unit having an input stage comprising a secondary winding and two primary windings; said two primary windings having one terminal each connected to opposite wires of said telephone line and the other terminal on each connected to opposite ends of a first diagonal on said rectifier bridge; power input terminals on said amplifier units; circuit means for connecting the opposite ends of a second diagonal on said rectifier bridge to the power input terminals on said amplifier units to thereby energize said amplifier units from the telephone lines.

2. A loudspeaking telephone instrument adapted for connection to a telephone line having two wires, said instrument containing a rectifier bridge; two amplifier units, one for each direction of signal transmission, coupled to said telephone line; one amplifier unit comprising a push-pull amplifier stage; means for inductively coupling the push-pull output stage of said one amplifier unit to said telephone line including a transformer having separate windings for each amplifying element in said push-pull stage, a separate rectifier connected across the transformer windings for each amplifying element, said rectifiers having a negative bias of such magnitude that the rectifiers do not normally load circuits connected to said transformer windings and being poled in opposite directions; the other amplifier unit having an input stage comprising a secondary winding and two primary windings, said two primary windings having one terminal each connected to opposite wires of said telephone line and the other terminal on each connected to opposite ends of a first diagonal on said rectifier bridge, power input terminals on said amplifier units, circuit means for connecting the opposite ends of a second diagonal on said rectifier bridge to said power input terminals to thereby energize said amplifier units from said telephone line.

3. A loudspeaking telephone instrument adapted to be connected to a telephone line having two wires, said instrument containing a rectifier bridge; two amplifier units, one for each direction of signal transmission, connected to said telephone line; one amplifier unit comprising a push-pull output stage; means for inductively coupling the push-pull output stage of said one amplifier unit to said telephone line including a transformer having a separate pair of primary windings connected to each amplifying element in said push-pull stage with corresponding secondary windings connected to said telephone line wires; a separate rectifier connected across the pair of transformer windings for each amplifying element; said rectifiers having a negative bias of such magnitude that the rectifiers do not normally load the circuits connected to said windings and being poled in opposite directions; the other amplifier unit having an input stage comprising a secondary winding and two primary windings, said two primary windings having one terminal each connected to opposite wires of said telephone line and the other terminal on each connected to opposite ends of a first diagonal on said rectifier bridge; power input terminals on said amplifier units; circuit means for connecting the opposite ends of a second diagonal on said rectifier bridge to said power input terminals to thereby energize said amplifier units from said telephone lines.

References Cited in the file of this patent

UNITED STATES PATENTS

| | | |
|---|---|---|
| 2,369,460 | Herrick | Feb. 13, 1945 |
| 2,885,478 | Cerofolini | May 5, 1959 |